(12) United States Patent
van der Merwe et al.

(10) Patent No.: US 9,022,291 B1
(45) Date of Patent: *May 5, 2015

(54) INVISIBLE OPTICAL LABEL FOR TRANSMITTING INFORMATION BETWEEN COMPUTING DEVICES

(71) Applicant: Apple Inc., Cupertino, CA (US)

(72) Inventors: Rudolph van der Merwe, Portland, OR (US); Samuel G. Noble, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,754

(22) Filed: Jul. 24, 2014

(51) Int. Cl.
*G06K 7/12* (2006.01)
*G06K 7/10* (2006.01)
*G06K 7/14* (2006.01)
*G06K 19/06* (2006.01)

(52) U.S. Cl.
CPC ............ *G06K 7/1095* (2013.01); *G06K 7/1408* (2013.01); *G06K 7/1447* (2013.01); *G06K 19/06112* (2013.01); *G06K 19/06103* (2013.01)

(58) Field of Classification Search
USPC .................................. 235/469, 380, 375, 383
IPC ...... G06K 7/12,19/06037; G07F 7/1008; G06Q 20/341, 30/06, 20/20, 30/02
See application file for complete search history.

(56) References Cited

U.S. PATENT DOCUMENTS

2007/0133359 A1* 6/2007 Mijiritskii et al. .............. 369/14
2011/0062237 A1* 3/2011 Chaves ......................... 235/454

* cited by examiner

*Primary Examiner* — Karl D Frech
(74) *Attorney, Agent, or Firm* — Brownstein Hyatt Farber Schreck, LLP

(57) ABSTRACT

Embodiments of the present disclosure provide a method and system for sharing information between a first computing device and a second computing device. In the described embodiments, an optical label, such as, for example a QR code, is generated on the first computing device. In embodiments, the optical label is color encoded and displayed in such a way that the optical label is not perceptible to a user. The second computing device may capture the encoded optical label and subject the captured images to a processing technique that decodes the encoded optical label.

20 Claims, 7 Drawing Sheets

INVISIBLE OPTICAL LABEL FOR TRANSMITTING INFORMATION BETWEEN COMPUTING DEVICES

TECHNICAL FIELD

The present disclosure is directed to using an optical label, such as a Quick Response (QR) code for transmitting information between computing devices. More specifically, the present disclosure is directed to generating and displaying an optical label on one computing device that is invisible or otherwise not perceptible by a human eye but is visible to a second computing device that is to receive information from the first computing device.

BACKGROUND

Typically, data matrix codes, Quick Response (QR) codes, bar codes and the like, enable a computing device to determine various types of information. For example, if a QR Code is present on a product, the QR code may be read by a bar code reader and provide the computing device information about the particular product. While these types of codes are useful in providing information about a particular product or device that is associated with the code, the aesthetics of the code may not be pleasing. For example, a QR code is typically a square symbol. Information is encoded in the intensity of square modules that make up the symbol. Because the look of these codes may not be aesthetically pleasing, the use of such codes may be restricted to products in which design characteristics and aesthetics may be secondary considerations.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a method for transmitting information between a first computing device and a second computing device. The method includes generating an optical label on the first computing device. In embodiments, the optical label may be a machine readable code, a one or two dimensional information symbol and the like. Non-limiting examples include a data matrix code, a bar code, a QR code and so on. In embodiments, the optical label is color coded and output on a display of the first computing device in such a way that the optical label is not perceptible to a user when displayed. More specifically, when the optical label is output on the display of the first computing device, the optical label is color encoded and displayed in alternating frames.

For example, a first frame of the optical label is encoded using a first set of colors and a second frame of the optical label is encoded using a second set of colors. More specifically, a first portion of the first frame of the optical label is encoded in a first color and a second portion of the first frame of the optical label is encoded in a second color. Further, a first portion of the second frame of the optical label is encoded in a third color and a second portion of the second frame of the optical label is encoded in a fourth color. As will be explained below, each of the first color and the third color offset one another and each of the second color and the fourth color offset one another. As a result, when the first computing device displays the alternating frames at a determined frequency, the colors of the encoded optical label cancel each other out and the optical label is not perceptible by a user of the first computing device.

Also disclosed herein is a method for pairing a first device with a second device. The method for pairing the first device with the second device includes capturing alternating frames of an optical label that is displayed on the first device. In embodiments, the alternating frames of the optical label are displayed at a first frequency. Further, the alternating frames of the optical label are captured by the second device at a second frequency. In embodiments, the second frequency may be lower than twice a cycle frequency. Once the optical label has been captured by the second device, the second device processes the captured alternating frames to determine and recreate the originally generated optical label. The recreated optical label may then be used to pair the second device with the first device.

BRIEF DESCRIPTION OF THE DRAWINGS

FIGS. 2B-2E illustrate alternating frames of an optical label having colors in opposition according to one or more embodiments of the present disclosure;

DETAILED DESCRIPTION

Figure 1A:
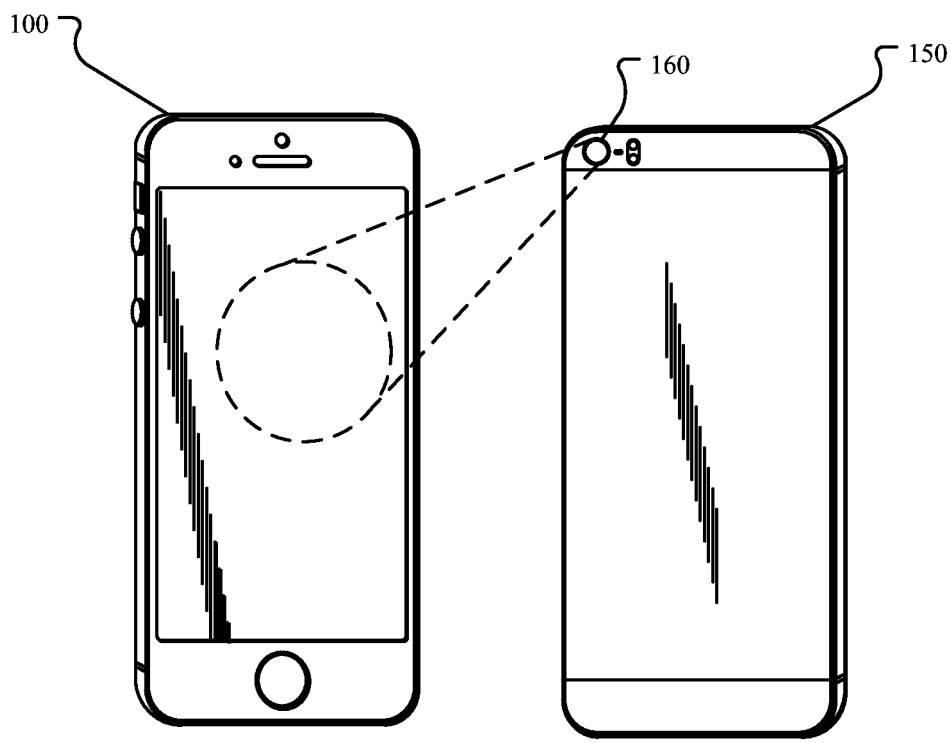
FIGS. 1A-1B illustrate exemplary computing devices that may be used to transmit data using the optical label disclosed in the embodiments of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein.

Oftentimes, a first computing device may need to share information with a second computing device. In one example, a first computing device may need to be paired with a second computing device. Pairing is a process in which two computing devices establish a communication channel with each other. Once the communication channel is established, each computing device may share information with the other. Common examples of pairing between devices include a BLUETOOTH pairing of a mobile phone with another device such as, for example, another mobile telephone, a car stereo, headphones and the like. In other examples multiple computers may be paired together.

Typically, when one device is paired with another, a first device enters a discovery mode. While in the discovery mode, the device searches for another device to which it can connect. Once the to-be-paired device has been discovered and selected for pairing, one device may proceed to authenticate the other device such as, for example, by asking for a passkey or password.

As will be explained in greater detail below, embodiments of the present disclosure are directed to using an optical label, such as, for example, machine readable code, a one or two dimensional information symbol, an Aztec code, a data matrix code, a QR code, a bar code and so on, to transmit information between computing devices. As will be explained below, this information may be used to pair a first computing device with a second computing device. However, because these optical labels may not be aesthetically pleasing to individual users, the optical label disclosed herein is not perceptible or is otherwise invisible to a user. However, the optical label is visible or otherwise perceptible to a sensor associated with the computing device that is receiving the information or that is to be paired with the first computing device.

In embodiments, the optical label is generated on a first computing device. The optical label includes information that may be used to pair the first computing device with the second computing device. Once the optical label has been generated by the first computing device, the optical label is output on a display of the first computing device. For example, the optical label may be output on the display as a background image or as part of a background image on the first computing device. As will be further explained below, the optical label may be output on the display as two alternating frames that are displayed at a fast rate such as, for example, sixty frames per second.

More specifically, when the optical label is output on the display, each frame is optically encoded in one or more images that are present on the display of the computing device. For example, each frame is encoded using particular colors that when averaged, blend in with the displayed images. As a result, when the frames of the optical label are displayed in rapid alternation, the colors of each frame cancel each other out.

As will be explained in greater detail below, the patterns of the optical label are encoded in a chrominance space while the luminance of each of the frames remains constant. As a human eye is more sensitive to luminance than chrominance, the change in the chrominance space will not be, or likely not be, perceived by a user.

As the optical label is being output on the display of the first computing device, a sensor, such as, for example, an image sensor, on a second computing device is able to read the optical label. More specifically, the sensor of the second computing device captures the alternating frames of the optical label. In embodiments, the rate of capture is less than the signal frequency at which the optical label is being output on the display of the first computing device. For example, if the frames of the optical label are being output on the display of the first computing device at sixty frames per second, the second computing device may capture the frames of the optical label at a rate of thirty-five frames per second. In other embodiments, the rate of capture may be higher than the signal frequency, such as, for example twice the signal frequency or higher.

Once the frames have been captured over a specified time period, the second computing device processes the captured images to obtain a representation of the optical label and may use the representation of the optical label to obtain the information that was transmitted by the first computing device. For example, if the optical label is used to pair the devices, the representation of the optical label may be processed by an optical label detector and decoder and the paring between the first computing device and the second computing device may occur.

Figure 1B:
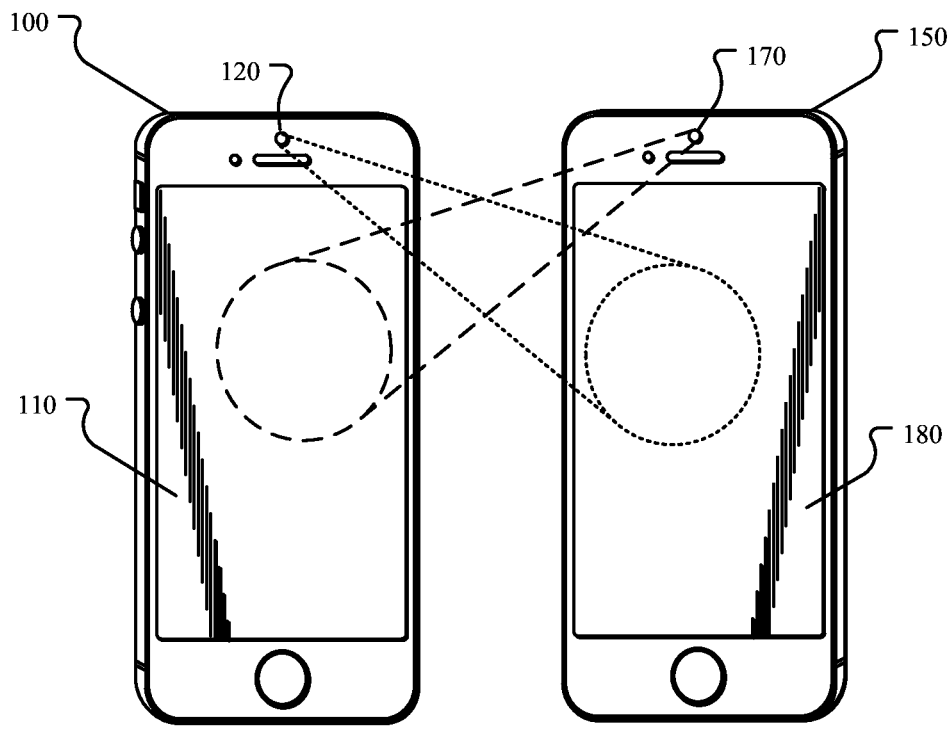

FIG. 1A and FIG. 1B illustrate exemplary computing devices 100 and 150 respectively that may exchange information and/or be paired together using the optical label disclosed herein. In certain embodiments, each of the computing devices 100 and 150 may be portable computing devices. For example, the computing devices 100 and 150 may be mobile telephones. In another embodiment, the computing devices 100 and 150 may be wearable computing devices. In still yet other embodiments, computing device 100 may be a wearable computing device and computing device 150 may be a mobile telephone. Although specific examples have been given, computing device 100 and computing device 150 may be various types of computing devices. For example, the computing devices of the present disclosure may be tablet computers, laptop computers, time keeping devices, computerized glasses, navigation devices, sports devices, portable music players, health devices, medical devices and the like.

As shown in FIG. 1A and FIG. 1B, computing device 100 may include a display 110. The display 110 may be used to provide or otherwise output information that is stored in a memory of the computing device 100. For example, the display 110 may present information corresponding to one or more applications that are executed or stored on the computing device 100. Such applications may include email applications, phone applications, calendaring applications, game applications, time keeping applications and the like.

In addition, the display 110 of the computing device 100 may be configured to output an optical label in one or more images that are presented on the display 110. Although a display is specifically mentioned, the optical label of the present disclosure may be output on any display mechanism. The optical label may be machine readable code, a one or two dimensional symbol, an Aztec code, a data matrix code, a binary code, an n-level code, a QR code, a bar code or any other optical information, type of code or digital representation of information that takes the form of a non-alphanumeric pattern. In other embodiments, the optical label may be made up of alphanumeric patterns. The optical label may be used to enable computing device 100 to share information with or be paired with computing device 150 and/or vice versa. In other embodiments, the optical label may be used for authentication and security purposes, to verify purchases of particular products, software or media verification and so on.

The optical label of the present disclosure may be generated by the computing device 100 in response to a received command. In other embodiments, the optical label may be generated by the first computing device 100 when the computing device 100 is placed near or within a predetermined distance from the computing device 150. The optical label may include information that is needed to establish a secure connection between the computing device 100 and the computing device 150. For example, the optical label may include a particular byte sequence of a defined length that is used to establish a secure handshake between the computing device 100 and the computing device 150.

Once the optical label has been generated, the computing device 100 may output the optical label on the display 110.

For example, the optical label, or portions of the optical label, may be present or embedded in various types of images on the display 110. For example, the optical label, or portions of the optical label may be included or embedded in an icon, a wallpaper or other background image, a lock screen or any other static or dynamic image that is output on the display 110. However, although the optical label may be included as part of the images that are output on the display 110, the optical label may be invisible or otherwise not perceptible to a user such as will be described below.

In embodiments, the optical label is displayed in alternating frames at a frequency that does not cause flicker on the display 110. For example, the frames of the optical label may be output on the display at approximately sixty frames per second although other frequencies may be used. Further, each alternating frame may be encoded with a particular color. Thus, as the frames are output at the given frequency, the colors of each frame cancel each other out or otherwise cause the optical label to appear as if it is part of the images that are presently output on the display 110. More specifically, each frame may be encoded with a particular set of colors with specific properties such that the colors from the first frame and the corresponding colors from the second, alternating frame, are perceptually neutral when averaged by the human eye.

Once the optical label has been output on the display 110, the computing device 150 may be positioned with respect to the display 110 such that a sensor 160 associated with the computing device 150 may capture the alternating frames of the optical label that are output on the display 110. In embodiments, the sensor 160 may be an image sensor such as a camera or other such device that enables the computing device 150 to capture the alternating frames of the optical label.

The sensor 160 may capture the alternating frames of the optical label at a frame rate that is less than the frequency at which the frames of the optical label are being output on the display. For example, if the alternating frames of the optical label are output on the display at sixty frames per second, the sensor 160 may capture the images between approximately twenty frames per second and forty frames per second. In another embodiment, the sensor 160 may capture the alternating frames of the optical label at a frame rate that is equal to or substantially equal to the frequency at which the frames of the optical label are being displayed.

In still yet another embodiment, the sensor 160 of the computing device 150 may capture the alternating frames of the optical label at a frame rate that is greater than the frequency at which the frames of the optical label are being output on the display 110 of the computing device 100. For example, if the frames of the optical label are being displayed at sixty frames per second, the sensor 160 of the computing device 150 may capture the frames of the optical label at a frequency of, sixty-one frames per second, sixty-two frames per second or even one hundred and twenty frames per second among others.

Once the frames of the optical label have been captured by the sensor 160 of the computing device 150, the sequence of captured images are processed and decoded. More specifically, the computing device processes the captured images to reconstruct the optical label that was originally generated by the computing device 100. For example, if the original optical label was a QR code consisting of dark squares on a light background (or light squares on a dark background), the computing device 150 would reconstruct a copy of the originally generated QR code. Once the optical label has been reconstructed, the reconstructed optical label may be provided to an optical label decoder and used to pair the computing device 100 with computing device 150.

Although not shown in FIG. 1A and FIG. 1B, the computing device 100 and the computing device 150 may include additional sensors and other components. For example, each computing device may include a microphone, a processor, a memory, a haptic actuator, a light source and other such components. These specific components, as well as other components of an exemplary computing device are shown below with respect to FIG. 5 and FIG. 6. In embodiments, each computing device 100 and 150 may include multiple components of the same or similar type. For example, the computing device 100 may include multiple sensors such as multiple cameras, multiple processors and so on.

Further, the computing device 100 and the computing device 150 may include other components not shown or described above. For example, the computing device 100 may include a keyboard or other input mechanism. Additionally, the computing device 100 may include one or more components that enable the computing device 100 to connect to the internet and/or access one or more remote databases or storage devices. The computing device 100 may also enable communication over wireless media such as acoustic, radio frequency (RF), infrared, and other wireless media mediums. Such communication channels may enable the computing device 100 and computing device 150 to remotely connect and communicate with each other or with one or more additional devices such as, for example, a laptop computer, tablet computer, personal digital assistant, portable music player, speakers and/or headphones and the like.

The computing device 100 and computing device 150 may also be configured to provide haptic output to notify a user of each computing device of a particular condition of the computing device. For example, computing device 100 may provide a haptic output, a visual notification, an auditory notification or a combination thereof to notify a user that the computing device has generated and is displaying an optical label. Likewise, computing device 150 may be configured output similar notification when the pairing between the devices has completed.

FIG. 1B illustrates an alternative embodiment in which computing device 100 and computing device 150 may be paired together using the optical label of the present disclosure. As shown in FIG. 1B, computing device 100 may include a display 110 such as described above. Likewise, computing device 150 may also include a display 180. As with computing device 100, computing device 150 may be configured to generate and output an optical label on the display 180. In embodiments, the optical label may be generated, encoded and output on the display 180 such as described herein.

Once an optical label has been output on display 180, a sensor 120 associated with computing device 100 may capture the optical label that is output on the display 180. Likewise, a sensor 170 associated with the computing device 150 may capture the optical label that is generated by the computing device 100 and output on display 110. In embodiments, sensor 120 and sensor 170 may be image sensors, such as, for example a camera or other device that enables each computing device 100 and 150 to capture optical output.

Once each sensor 120 and 170 have captured the frames of the optical label provided by the other computing device, each computing device 100 and 150 processes their respective captured images. When the captured images have been processed and each optical label has been reconstructed, the optical labels may be used to pair the computing device 100 with computing device 150 and vice versa.

In embodiments, each computing device 100 and 150 may be configured to generate and display their respective optical labels in sequence. For example, computing device 100 may generate and display its optical label at a first time. As the optical label is being output on the display 110, the sensor 170 associated with computing device 150 may capture the sequence of images and reconstruct the optical label generated by the computing device 100. In embodiments, the display, capturing and reconstruction of the optical label may be performed in real-time or substantially real time. For example, as the computing device 100 is outputting the optical label, the computing device 150 may be reading and providing the received optical label to a processor in order to obtain the information associated with the optical label. The computing device 150 may then generate, encode and output an optical label on its display 180 at a second time. When the optical label is output on the display 180, sensor 120 may capture the displayed optical label and process the captured images such as described herein to recreate the optical label generated by the computing device 150. In other embodiments, the mutual pairing of the computing devices 100 and 150 may occur simultaneously or substantially simultaneously.

Figure 2A:
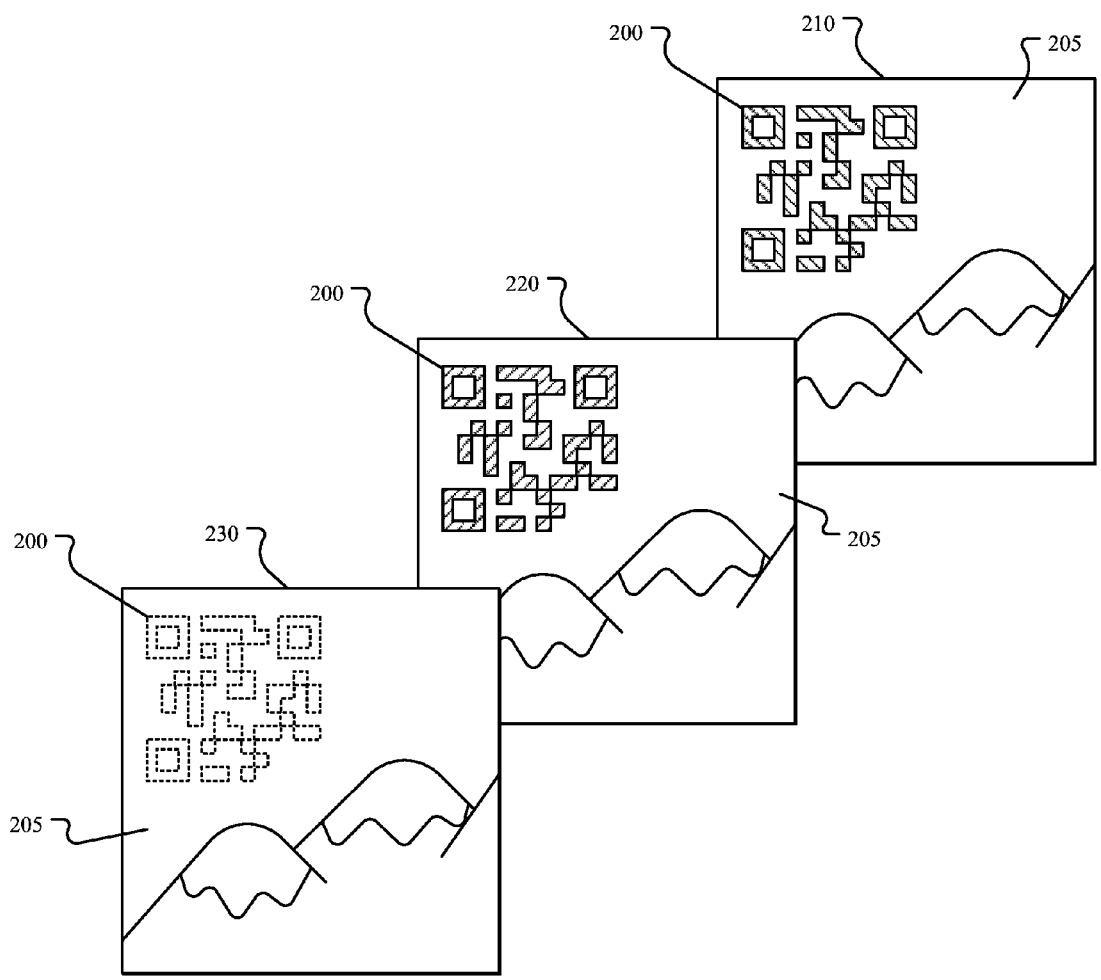
FIG. 2A illustrates an exemplary background image and optical label that is output on a display of a computing device according to one or more embodiments of the present disclosure.

FIG. 2A illustrates an exemplary background image 205 that is output on a display of a computing device according to one or more embodiments of the present disclosure. More specifically, FIG. 2A illustrates various frames of an optical label 200 that is chroma encoded in background image 205 that is output on a display of a computing device. In embodiments, the optical label 200 such as shown in FIG. 2 may be the optical label that is described with respect to FIGS. 1A-1B and FIGS. 3-6. Although embodiments disclosed herein discuss the chroma space, the processes described herein may also be used with luminance and/or with a combination of chrominance and luminance. However, as the human eye is more sensitive to luminance, the distance from a target value when offsetting the colors (such as will be described below) may be smaller and/or the display frequency of the optical label may need to be higher.

In embodiments, the optical label 200 may be a data matrix code, a QR code, a bar code, a one or two dimensional symbol, an Aztec code and so on. In other embodiments, the optical label 200 may be a binary code, n-level code or any other optical code that may be read by a computing device. As such, the optical label 200 may include light portions and dark portions and may be arranged in a particular pattern. For example, if the optical label 200 is a QR code, the QR code would consist of light squares on dark background, dark squares on a light background, or other color combinations. In embodiments, the pattern of the optical label 200 and the shapes used in the optical label may vary.

In addition, the optical label 200 may be static or dynamic with respect to the device that generates the optical label 200. For example, when a request is received to generate the optical label 200, such as, for example in response to a user request or in response to a received request from another device, the computing device may display an optical label 200 that was previously generated or is constant with respect to the computing device. In another embodiment, the computing device may generate a new optical label 200 each time a request is received.

Once the optical label 200 has been generated, the computing device that generated the optical label 200 temporally encodes two distinct frames of the optical label 200 with various colors in a chroma space. More specifically, a first frame 210 of the optical label 200 is encoded using temporal chroma encoding such that the dark portions of the optical label 200 are encoded using a first color and the light portions of the optical label 200 are encoded using a second color. Likewise, a second frame 220 of the optical label 200 is temporally chroma encoded in a similar manner. For example, the dark portions of the second frame 220 of the optical label 200 are chroma encoded using a third color and the light portions of the second frame 220 of the optical encoder are temporally chroma encoded using a fourth color.

In embodiments, the first color and the second color are in opposition to the third color and the fourth color respectively. For example, the colors are in opposition to each other in any perceptually meaningful color space, such that their arithmetic mean is at or near a target value. Thus, when the temporal average of the colors in opposition is determined, the temporal average would be a color without chroma (e.g., gray). For example, the first and second colors may be blue and magenta while the third and fourth colors are orange and green. As blue and orange are in opposition and as magenta and green are in opposition, the temporal average of the colors is gray.

Although specific colors are mentioned, any colors may be used to encode the alternating frames of the optical label 200 so long as the colors selected are in opposition according to some desired psychovisual perceptual metric. Further, although the temporal average in the above example is equivalent to gray, the temporal average of the selected colors may be equivalent to any image color. Thus, if the background image 205 on which the optical label 200 is placed is blue, the temporal average of the opposing colors of the first frame 210 and the second frame 220 will also be blue. As a result, the optical label 200 will not be perceptible to a user when the optical label 200 is present on the image 205 such as shown in frame 230. In addition, if a portion of the optical label 200 is on a first color and another portion of the optical label 200 is on a second color, the temporal average of each portion of the optical label 200 that overlap the various colors will be calculated accordingly. Thus, the optical label 200 may be embedded in a static graphic, image or background, or a dynamic graphic, image or background.

Once the first frame 210 and the second frame 220 have been encoded in the manner described above, the frames are alternately output on a display. In certain embodiments, the first frame 210 and the second frame 220 are output on the display at a rate of approximately sixty frames per second although other frequencies may be used. Display of the alternating frames 210 and 220 causes the optical label 200 to blend in with the background image 205 that is output on the display or otherwise causes the optical label 200 to not be perceptible by a user such as shown in frame 230.

Figure 2E:
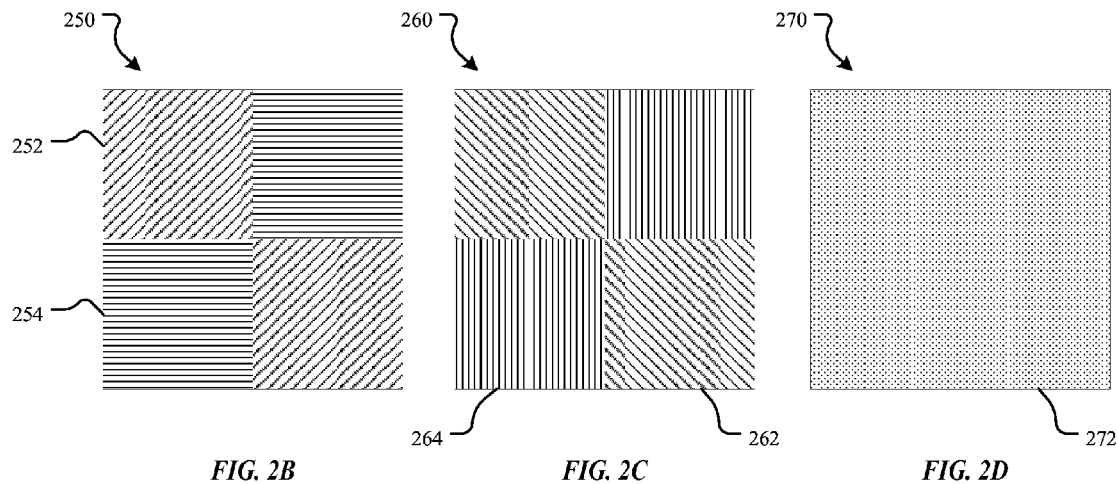
Figure 2E:
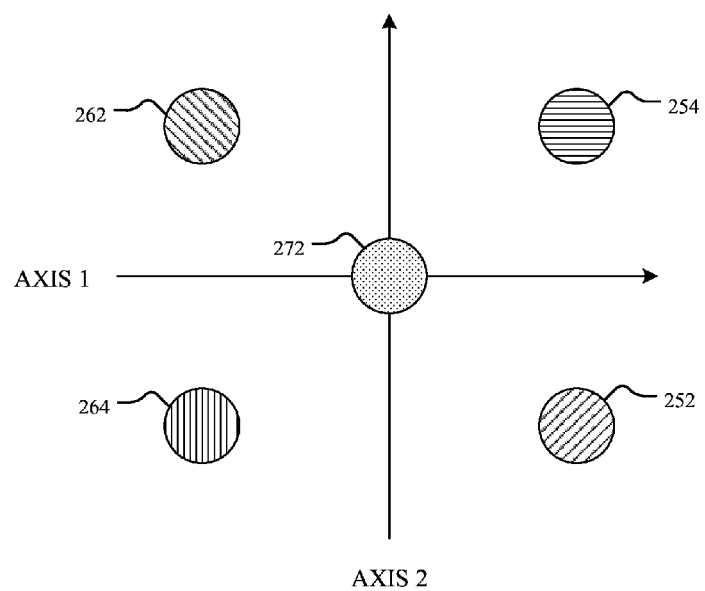

FIGS. 2B-2E illustrate alternating frames of an optical label, such as, for example, optical label 200, having colors in opposition according to one or more embodiments of the present disclosure. More specifically, FIG. 2B illustrates a first frame 250 of an optical label having two colors 252 and 254 in a color space. Likewise, FIG. 2C illustrates a second frame 260 of an optical label having two colors 262 and 264 in the color space. As the first frame 250 and the second frame 260 alternate, the color 252 offsets the color 262 in a chroma space such as shown in FIG. 2E. Likewise the color 254 offsets the color 264 in a chroma color space as also shown in FIG. 2E. The resulting image 270 of the alternating frames 250 and 260, such as shown in FIG. 2D is a color 272 without chroma.

For example, as shown in FIG. 2E, each of the colors in a color space are in opposition along different axis of a color space. As a result, the temporal average of the colors 252, 254, 262 and 264 yield a color 272 without chroma. Although the temporal average discussed above is a color without chroma, the temporal average of the four colors may be any color having various chrominance values and/or luminance values. For example, the temporal average of the four colors may be any color that matches various colors of displayed images that are output on display of a computing device.

Figure 3:
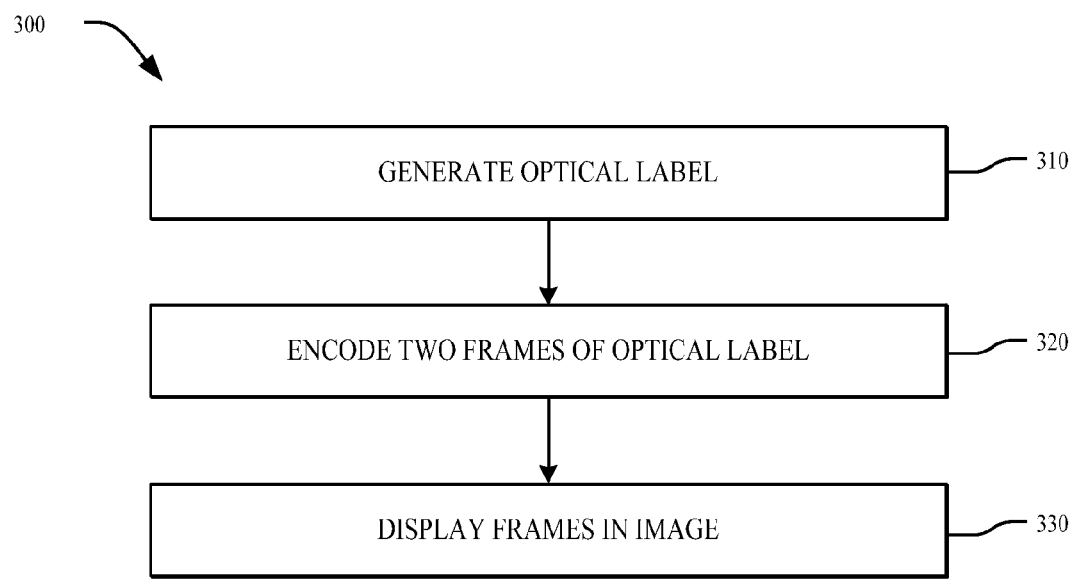
FIG. 3 illustrates a method for generating, encoding and displaying an optical label on a display of a computing device according to one or more embodiments of the present disclosure.

FIG. 3 illustrates a method 300 for generating, encoding and displaying an optical label according to one or more embodiments of the present disclosure. In embodiments, the method 300 may be used for generating, encoding and displaying the optical label shown and described above with reference to FIGS. 1A-2.

Method 300 begins when an optical label is generated. In embodiments, the optical label may be generated by a first computing device that is to transmit information to, or be paired with a second computing device. For example, the optical label may be used to convey information in a human-imperceptible but machine-perceptible manner. The optical label may be generated in response to a received command. The received command may be from a user, an application, or from the second device. For example, when the first device is placed within a predetermined distance from the second device, the first device may receive a request to generate an optical label. In another embodiment, the first device may receive a pair command from a user or application. When such a command is received, the optical label may be generated.

In certain embodiments, the optical label may be machine readable code, a one or two dimensional information symbol, a data matrix code, a bar code, a QR code or other optical representation of data such as described above. The optical label may be generated using a variety of different patterns, colors and so on.

Once the optical label has been generated, flow proceeds to operation 320 in which two frames of the optical label are temporally chroma encoded. More specifically, the optical label is divided into two distinct frames. Each distinct frame of the optical label is undergoes a temporal encoding process. For example, a first frame of the optical label is encoded using temporal chroma encoding such that a first portion of the first frame of the optical label is encoded using a first color. Further, a second portion of the first frame of the optical label is encoded using a second color. Likewise, a second frame of the optical label undergoes a temporal chroma encoding process in which a first portion of the second frame of the optical label is chroma encoded using a third color. In addition, a second portion of the second frame of the optical encoder is chroma encoded using a fourth color.

In embodiments, the first color and the second color are in opposition to the third color and the fourth color respectively. Thus, when the temporal average of the first color and the third color is calculated, the temporal average would be a color without chroma. Likewise, when the temporal average of the second color and the fourth color is calculated, the temporal average of the second color and the fourth color is also a color without chroma (e.g., gray).

Furthering the example, the first and second colors may be blue and magenta while the third and fourth colors may be orange and green. Blue and orange are in opposition to each other in a chroma space and magenta and green are also in opposition in the chroma space. As such, the temporal average of the colors is gray.

Although the temporal average discussed above is a color without chroma, the temporal average of each of the four colors may be any color. More specifically, the temporal average of the four colors may be any color that matches various colors of displayed images that are output on display of a computing device.

For example, if the image on which the optical label is to be encoded in is blue, the temporal average of the opposing colors of the first frame and the second frame may also be blue. In addition, if a portion of the optical label is to be encoded in an image having multiple colors, each portion of the optical label will have a temporal average that matches the overlapped portion of the image. As a result, the optical label may be embedded in a static graphic, image or background, or a dynamic graphic, image or background such as, for example an animation, slideshow, streaming media and other such content and the like.

Once the first frame and the second frame have been encoded, flow proceeds to operation 330 in which the first frame and the second frame are alternately output on a display of the computing device. In embodiments, the frequency of the displayed frames is approximately sixty frames per second. However, the frequency may be greater than sixty frames per second or less than sixty frames per second.

In embodiments, the frequency rate may be any rate which enables the alternating frames of the optical label to blend in with the displayed images so as to not be perceptible by a user. Further, the speed or frequency at which the frames are displayed may be selected based on a speed that reduces or otherwise eliminates any flicker that may be caused by alternating the frames.

Figure 4:
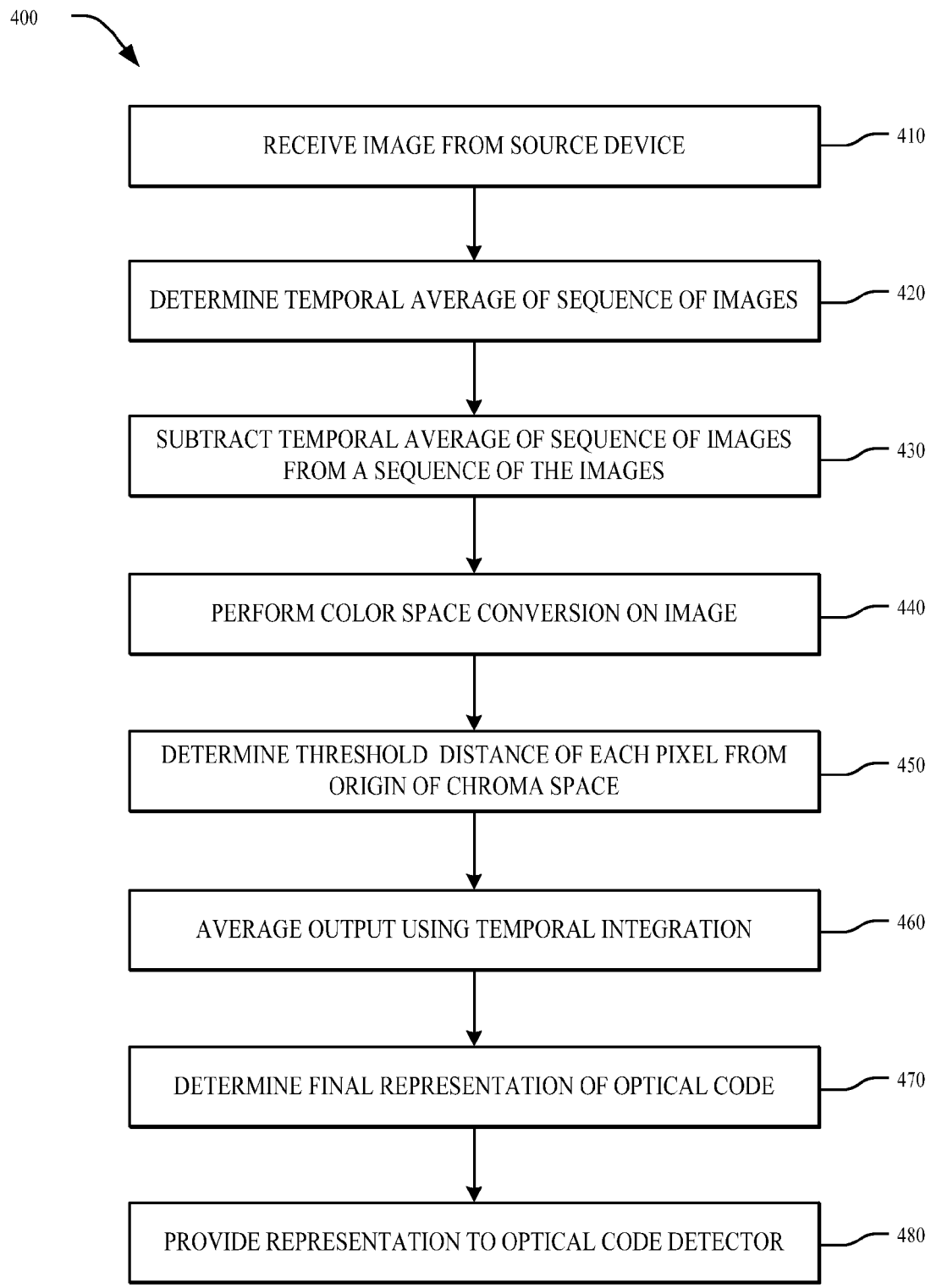
FIG. 4 illustrates a method for decoding captured frames of an optical label according to one or more embodiments of the present disclosure.

FIG. 4 illustrates a method 400 for decoding captured frames of an optical label according to one or more embodiments of the present disclosure. In embodiments, the method 400 may be used by electronic device 100 and/or electronic device 150 shown and described with respect to FIG. 1A and FIG. 1B. Further, the method 400 may be used to receive and decode an encoded optical label such as optical label 200 described above with respect to FIG. 2. Further, the method 400 may be used to decode and optical label such as an optical label that is generated, encoded and displayed with respect to method 300 described with respect to FIG. 3.

Method 400 begins when a computing device that is to be paired with a source computing device receives 410 or captures a series of images from the source computing device. The source computing device may be a time keeping device, a mobile phone, table computer, personal digital assistant, health device and so on. Further, the source computing device may be displaying an encoded optical label that has been temporally chroma encoded such that the optical label is not perceptible by a user but is perceptible by an image sensor of the computing device.

In order to receive the image provided by the source device, the computing device, and more specifically the image sensor of the computing device, may be placed in an orientation that enables the image sensor to capture a display of the source computing device. As discussed above, the display of the source computing device may be outputting or otherwise displaying the encoded optical label. In embodiments, the encoded optical label is being displayed as alternating frames having offsetting colors. Further, the encoded optical label is being displayed at a particular frequency such as, for example sixty frames per second.

In embodiments, the image sensor that is pointing at the display of the source computing device captures the displayed image sequence (e.g., the alternating frames of the optical label) at a frequency that is less than the frequency at which the alternating frames of the optical label are being displayed.

Continuing with the example above, if the frames of the encoded optical label are being displayed at a frequency of sixty frames per second, the image sensor may be capturing the sequence of images at a rate of thirty-five frames per second. Although a specific capture rate is discussed, in some embodiments, the capture rate may be between twenty and forty frames per second although other capture rates are contemplated. In embodiments, the sequence of images is captured over a time t. Once the image has been captured over the time t, the optical label may be processed and reconstructed by the computing device.

In some instances, the image that is captured by the image sensor of the computing device may be distorted due to a number of factors. For example, distance between the source computing and the capturing computing device may affect the amount of noise, and more specifically chroma noise (e.g., induced colors in the captured image that may corrupt the signal) that occurs during capture. Moiré patterns may also cause corruption in the signal. Other factors that may affect the amount of noise present in the captured sequence of images includes the angle between the source computing device and the capturing computing device, the resolution of the display of the source computing device, the resolution of the image sensor of the capturing computing device and so on.

In order to account for this added noise, certain embodiments provide that a filtering process occurs for each captured sequence. As the temporal characteristics of noise is different than the temporal characteristics of the optical label the computing device is receiving, a filtering process may be used to determine which of the signals are noise and which signals represent the optical label. More specifically, the temporal characteristics of each captured image, or more specifically the temporal characteristics of each pixel in each captured image, may be compared against an expected, anticipated or actual temporal characteristic of the received image. If the determined temporal characteristic of an image, or the determined temporal characteristic of a pixel in the image, is not within a determined threshold, that particular image or pixel in the image may be ignored. In other embodiments, the particular image or pixel may be modified, further processed, or factored into the analysis for future captured images or pixels.

Once the image has been captured over a given time period t, flow of the method 400 proceeds to operation 420 in which the temporal average of the sequence of captured images is determined. In embodiments, the calculated temporal average of the sequence of images will give a representation of the background image or images the optical label is encoded in.

Flow then proceeds to operation 430 in which the temporal average of the sequence of images is subtracted from the sequence of captured images. Such a calculation yields a representation of what is changing in the captured sequence of images. Thus, a result of this operation is a representation of the chroma encoded optical label that was encoded in the background image of the source computing device.

Operation 440 provides that a color space conversion is then performed on the representation of the optical label. More specifically, the image sensor of the computing device may be configured to capture the sequence of images from the source computing device using an RGB format. However, in order to accurately reconstruct the originally generated optical label, the luminance and chrominance in the representation of the optical label captured in the sequence of images may need to be separated. However, this separation may not occur in an RGB format. As such, a color space conversion occurs in which the RGB values of the representation of the optical label are converted into a YCbCr format or other such format in which luminance and chrominance may be separated.

Once the color space conversion occurs, flow proceeds to operation 450 and a determination is made as to which quadrants in a two dimensional chroma plane each pixel of the representation of the optical label occupies. Once the placement of each pixel is determined, a further determination is made as to whether the color of each of the pixels is greater than a threshold distance away from the average color of the received image. More specifically, the color vector of each pixel is analyzed to determine how far away the pixel is from the origin of the chroma space. If the placement of the pixel is equivalent to or beyond the threshold distance from the origin of the chroma space, and the pixel lies in the quadrant of the chroma space in which it was encoded, each pixel is assigned an encoded value. In some instances, the encoded value is either a zero or a one. As a result of this process, the representation of the optical label is now a noisy representation of the originally generated optical label (e.g., a noisy QR code consisting of black squares on a white background).

Flow then proceeds to operation 460 in which a temporal integration process is performed on the representation of the originally generated optical label. In this process, the average signal over the time t of each pixel of the noisy representation of the originally generated optical label is determined.

Once this process has completed, flow proceeds to operation 470 in which a binary determination is made as to the final representation of the optical label. For example, if the original optical label was a QR code, each pixel in the representation of the optical label is analyzed and a determination is made as to whether the particular pixel is a white portion of the QR code or a black portion of the QR code.

When the original optical label has been reconstructed, the reconstructed optical label is provided 480 to an optical label detector of the computing device. Once the optical label has been provided to and read by the optical label detector, the computing device may be paired with the source computing device.

Figure 5:
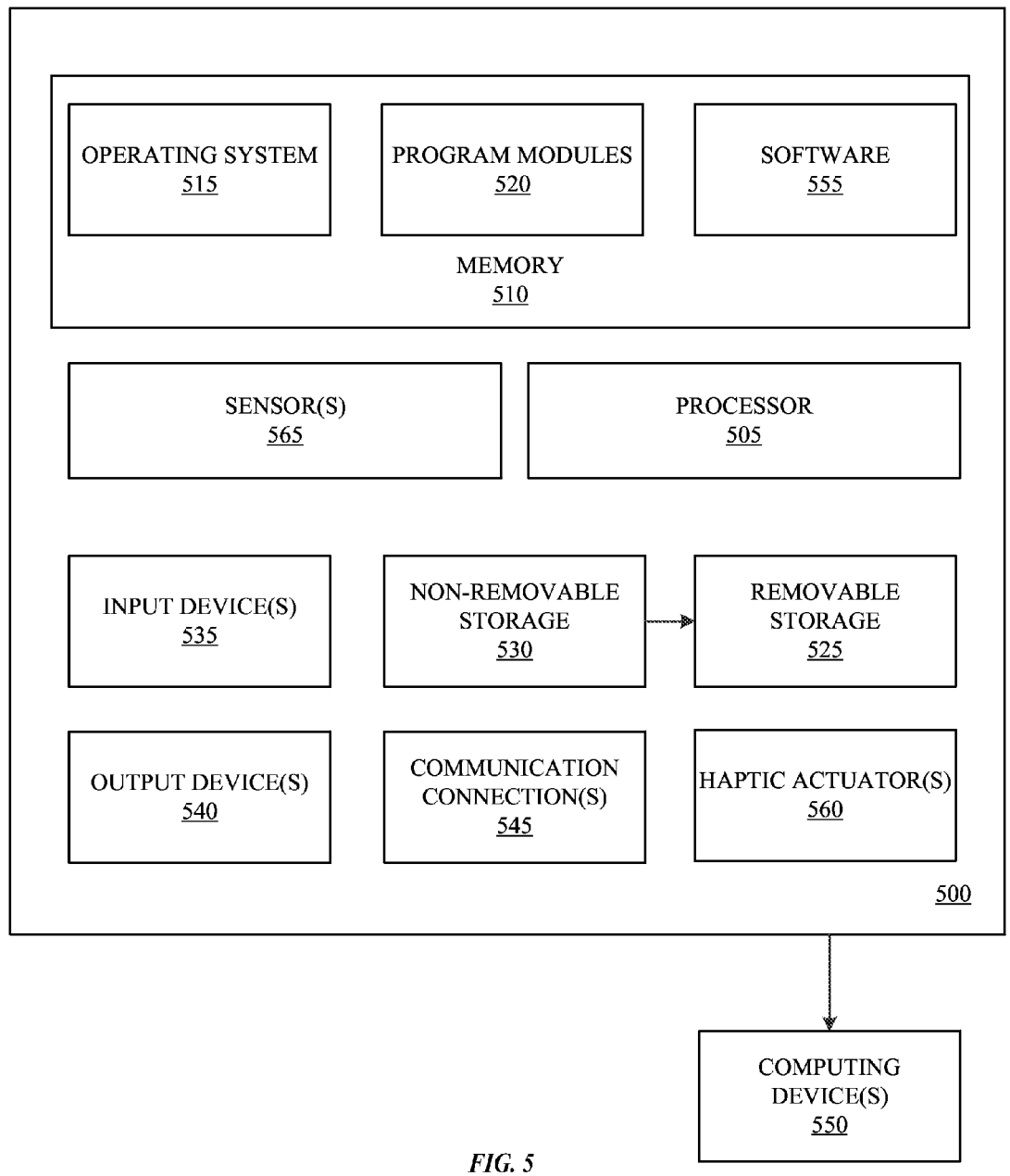
FIG. 5 is a block diagram illustrating example physical components of an computing device that may be used with one or more embodiments of the present disclosure.

FIG. 5 is a block diagram illustrating exemplary components, such as, for example, hardware components of a computing device 500 according to one or more embodiments of the present disclosure. In certain embodiments, the computing device 500 may be similar to the computing device 100 and the computing device 150 described above with respect to FIG. 1A and FIG. 1B. Although various components of the computing device 500 are shown, connections and communication channels between each of the components are omitted for simplicity.

In a basic configuration, the computing device 500 may include at least one processor 505 and an associated memory 510. The memory 510 may include, but is not limited to, volatile storage such as random access memory, non-volatile storage such as read-only memory, flash memory, or any combination thereof. The memory 510 may store an operating system 515 and one or more program modules 520 suitable for running software applications 555. The operating system 515 may be configured to control the computing device 500 and/or one or more software applications 555 being executed by the operating system 515. The program modules 520 or software applications 555 may include modules and programs for generating, encoding and displaying the optical labels disclosed herein. Further, the program modules 520 and the software applications 555 may enable the computing device 500 to read and process an encoded optical label such as described above.

The computing device 500 may have additional features or functionality than those expressly described herein. For example, the computing device 500 may also include additional data storage devices, removable and non-removable, such as, for example, magnetic disks, optical disks, or tape. Exemplary storage devices are illustrated in FIG. 5 by removable storage device 525 and a non-removable storage device 530.

In certain embodiments, various program modules and data files may be stored in the system memory 510. The program modules 520 and the processor 505 may perform processes that include one or more of the operations of methods 300 and 400 shown and described with respect to FIG. 3 and FIG. 4.

As also shown in FIG. 5, the computing device 500 may include one or more input devices 535. The input devices 535 may include a keyboard, a mouse, a pen or stylus, a sound input device, a touch input device, and the like. The computing device 500 may also include one or more output devices 540. The output devices 540 may include a display, one or more speakers, a printer, and the like. The computing device 500 may also include one or more haptic actuators 560 that are used to provide the haptic feedback such as described herein. As discussed above, the computing device 500 may also include one or more sensors 565. The sensors may include, but are not limited to, an image sensor, an accelerometer, an ambient light sensor, a gyroscope, a magnetometer and so on.

The computing device 500 also includes communication connections 545 that facilitate communications with additional computing devices 550. Such communication connections 545 may include a RF transmitter, a receiver, and/or transceiver circuitry, universal serial bus (USB) communications, parallel ports and/or serial ports.

As used herein, the term computer readable media may include computer storage media. Computer storage media may include volatile and nonvolatile media and/or removable and non-removable media for the storage of information. Examples include computer-readable instructions, data structures, and program modules. The memory 510, the removable storage device 525, and the non-removable storage device 530 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500.

Figure 6:
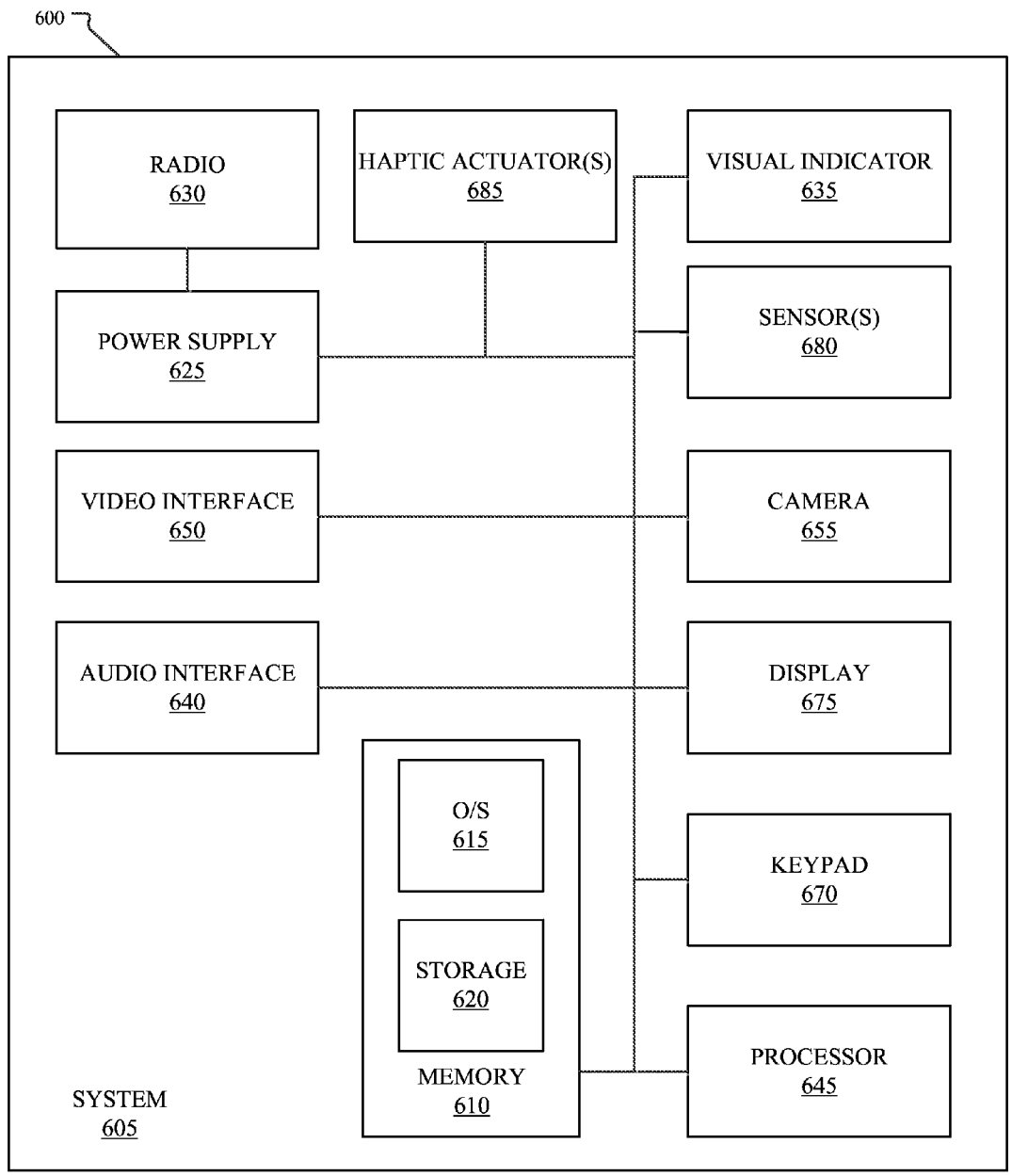
FIG. 6 is simplified block diagram of a computing device that may be used with one or more embodiments of the present disclosure.

FIG. 6 illustrates another exemplary computing device 600 according to one or more embodiments of the present disclosure. FIG. 6 is a block diagram illustrating the architecture of an computing device such as computing device 100 shown and described with respect to FIG. 1A or computing device 130 shown and described with respect to FIG. 1B. Although various components of the device 600 are shown, connections and communication channels between each of the components are omitted for simplicity.

In certain embodiments, the system 605 may execute one or more applications or programs. These applications or programs include optical label generators, optical label detectors, browser applications, email applications, calendaring applications, contact manager applications, messaging applications, games, media player applications and the like.

These programs, as well as other programs not specifically discussed above may be loaded into a memory 610. Further, these programs may be executed by, or in association with, the operating system 615. Additional exemplary application programs may include phone programs, e-mail programs, personal information management (PIM) programs, word processing programs, spreadsheet programs, Internet browser programs, messaging programs, and so on. The system 605 may also include a non-volatile storage area 620 within the memory 610. The non-volatile storage area 620 may be used to store persistent information. In certain embodiments, the application programs may use and store information in the non-volatile storage area 620. A synchronization application or module (not shown) may also be included with the system 605 to synchronize applications or data resident on the device 600 with another computer or device. In embodiments, the device 600 includes a power supply 625. The power supply 625 may be a battery, solar cell, and the like that provides power to each of the components shown. The power supply 625 may also include an external power source, such as an AC adapter or other such connector that supplements or recharges the batteries. The device 600 may also include a radio 630 that performs the function of transmitting and receiving radio frequency communications Additionally, communications received by the radio 630 may be disseminated to the application programs disclosed herein the operating system 615. Likewise, communications from the application programs may be disseminated to the radio 630 as needed.

The computing device 600 may also include a visual indicator 635, a keypad 660 and a display 665. In embodiments, the keypad may be a physical keypad or a virtual keypad generated on a touch screen display 665.

The visual indicator 635 may be used to provide visual notifications to a user of the computing device 600. The computing device 600 may also include an audio interface 640 for producing audible notifications and alerts. In certain embodiments, the visual indicator 635 is a light emitting diode (LED) or other such light source and the audio interface 640 is a speaker. In certain embodiments, the audio interface may be configured to receive audio input.

The audio interface 640 may also be used to provide and receive audible signals from a user of the computing device 600. For example, a microphone may be used to receive audible input. The system 605 may further include a video interface 650 that enables an operation of an on-board camera 655 to capture, record or otherwise receive the encoded optical label. The camera 655 may also capture still images, video, and the like.

In one or more embodiments, data and information generated or captured by the computing device 600 may be stored locally. Additionally or alternatively, the data may be stored on any number of storage media that may be accessed by the computing device 600 using the radio 630, a wired connection or a wireless connection between the computing device 600 and a remote computing device. Additionally, data and information may be readily transferred between computing devices.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for transmitting information from a first computing device to a second computing device, the method comprising:
   generating an optical label on the first computing device;
   generating a first frame of the optical label and a second frame of the optical label wherein:
      a first portion of the first frame is encoded in a first color and a second portion of the first frame is encoded in a second color; and
      a first portion of the second frame is encoded in a third color and a second portion of the second frame is encoded in a fourth color; and
   alternately displaying the first frame and the second frame at a frequency.

2. The method of claim 1, wherein the frequency is at least sixty frames per second.

3. The method of claim 1, wherein the first color and the third color are in opposition to each other in a color space.

4. The method of claim 1, wherein the second color and the fourth color are in opposition to each other in a color space.

5. The method of claim 1, wherein alternately displaying the first frame and the second frame at a frequency comprises alternately displaying the first frame and the second frame at a frequency at which the alternating frames are not perceptible by a human eye.

6. The method of claim 5, wherein alternately displaying the first frame and the second frame at a frequency comprises alternately displaying the first frame and the second frame at a frequency at which the alternating frames are perceptible by a sensor associated with the second computing device.

7. The method of claim 1, wherein alternately displaying the first frame and the second frame at a frequency comprises alternately displaying the first frame and the second frame in a background image.

8. The method of claim 1, wherein the optical label is machine readable code.

9. The method of claim 7, wherein the background image is a dynamic image.

10. A method for transmitting information between a first device and a second device, the method comprising:
    capturing alternating frames of an optical label displayed on the first device, wherein the alternating frames of the optical label are displayed at a first frequency and wherein the alternating frames of the optical label are captured by the second device at a second frequency; and
    processing the captured alternating frames to determine a representation of the optical label.

11. The method of claim 10, wherein the optical label is machine readable code.

12. The method of claim 10, wherein processing the captured alternating frames comprises determining a temporal average of a sequence of the alternating frames to determine an image on which optical label is displayed.

13. The method of claim 12, wherein processing the captured alternating frames further comprises subtracting the determined temporal average from the sequence of the alternating frames to determine a representation of the optical label.

14. The method of claim 13, wherein processing the captured alternating frames further comprises performing a color space conversion on the representation of the optical label.

15. The method of claim 14, wherein processing the captured alternating frames further comprises determining where each pixel in the representation of the optical label falls within a chroma plane.

16. The method of claim 15, wherein processing the captured alternating frames further comprises determining whether each pixel in the representation of the optical label is at least a threshold distance away from an origin of the chroma plane.

17. The method of claim 16, wherein processing the captured alternating frames further comprises assigning each pixel in the representation of the optical label an encoded value.

18. The method of claim 16, wherein processing the captured alternating frames further comprises determining a temporal characteristic of each pixel.

19. A computer-readable storage medium encoding computer executable instructions for performing a method for transmitting information from a first computing device to a second computing device, the method comprising:
    generating an optical label on the first computing device;
    generating a first frame of the optical label and a second frame of the optical label wherein:
       a first portion of the first frame is encoded in a first color and a second portion of the first frame is encoded in a second color; and
       a first portion of the second frame is encoded in a third color and a second portion of the second frame is encoded in a fourth color; and
    alternately displaying the first frame and the second frame at a frequency.

20. The computer-readable storage medium of claim 19, wherein the optical label is machine readable code.

* * * * *